United States Patent [19]

Roland

[11] 4,283,859
[45] Aug. 18, 1981

[54] METHOD AND APPARATUS FOR READING A KEY

[75] Inventor: Max G. Roland, Redwood City, Calif.

[73] Assignee: Maromatic Co., Inc., Mountain View, Calif.

[21] Appl. No.: 151,458

[22] Filed: May 19, 1980

[51] Int. Cl.³ .................. G01B 11/24; G01D 5/32
[52] U.S. Cl. .................................................. 33/174 F
[58] Field of Search ........... 33/174 F, 174 P, 174 PA, 33/174 L, 175, 172 R, 172 E, 148 L, 143 L, 149; 29/702; 70/460, 394; 250/578, 237 R, 232, 231 R; 356/386, 387, 376, 381

[56] References Cited

U.S. PATENT DOCUMENTS

| | | | |
|---|---|---|---|
| 2,177,133 | 10/1939 | Desch | 356/376 |
| 2,703,456 | 3/1955 | Smyth | 356/376 X |
| 3,226,811 | 1/1966 | Roland | 33/174 F |
| 3,253,153 | 5/1966 | Stoddard | 250/237 |
| 3,264,742 | 8/1966 | Roland | 33/174 F |
| 3,393,542 | 7/1968 | Crepinsek | 70/460 |
| 3,775,855 | 12/1973 | Marmel | 33/174 F |
| 3,840,301 | 10/1974 | Pryor | 356/354 |
| 4,090,303 | 5/1978 | Uyeda | 33/174 F |
| 4,176,460 | 12/1979 | Kaye | 33/174 L |

*Primary Examiner*—Harry N. Haroian
*Attorney, Agent, or Firm*—Larson and Taylor

[57] ABSTRACT

A method and apparatus for reading a key, preferably a key of the type having indentations formed in the flat sides of the key blade. Typical uses for such method and apparatus include incorporating the same in a machine for making a lock to be opened by that key or incorporation in a door lock to identify a given key and by this means a given holder of the key. Movement of reading pins which sense the key indentations are multiplied to cover or uncover groups of juxtaposed light paths to electronically record the depth of the key indentations. Plural indentations on a key can be read either sequentially or simultaneously in parallel.

9 Claims, 12 Drawing Figures

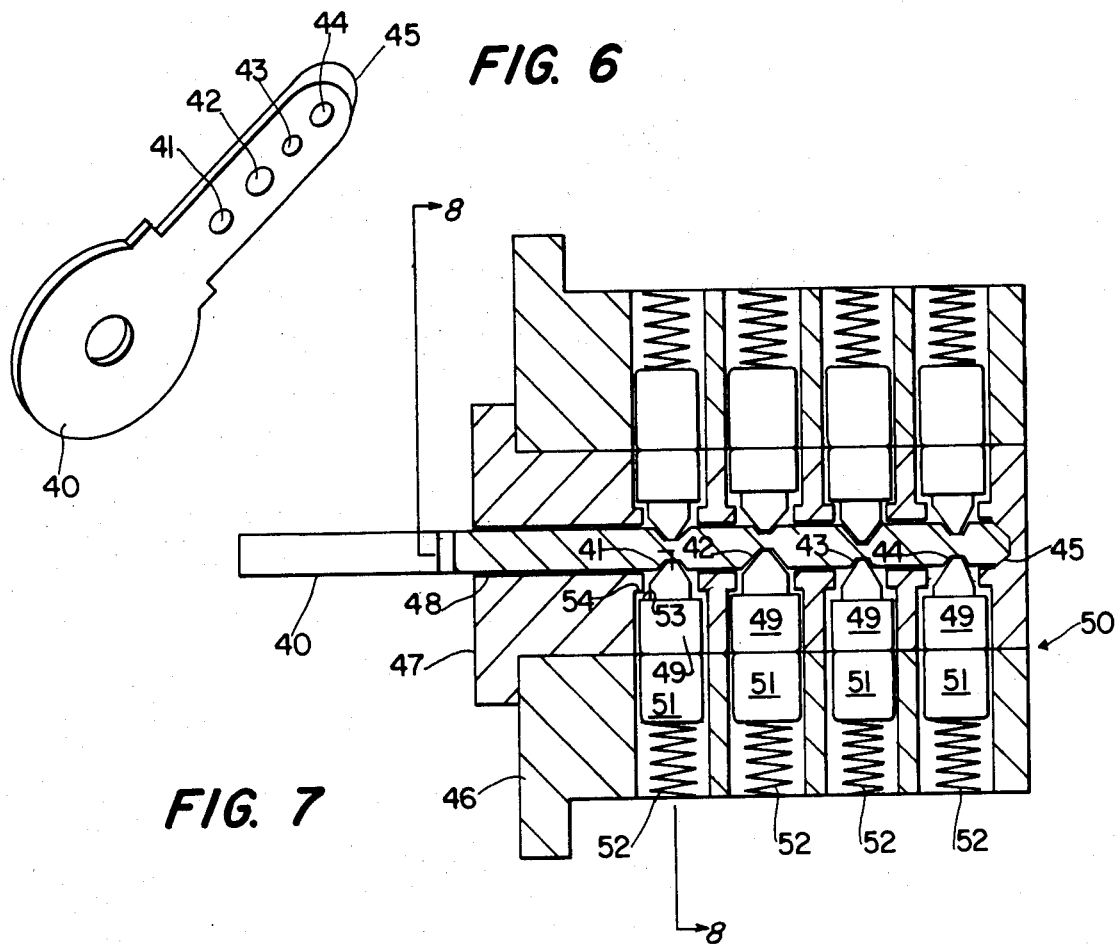
FIG. 6
FIG. 7
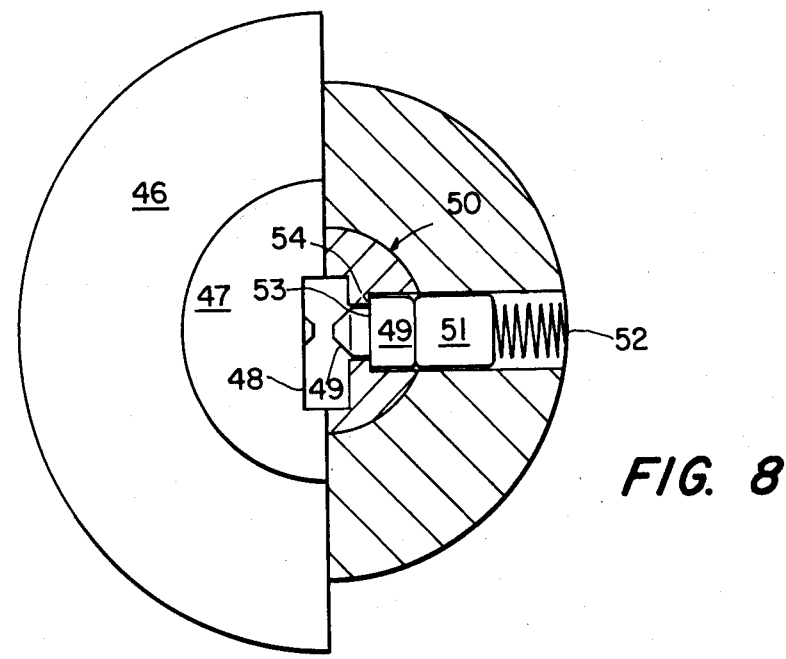
FIG. 8

METHOD AND APPARATUS FOR READING A KEY

TECHNICAL FIELD

This invention relates to the key and lock art, and more specifically, it relates to a method and apparatus for reading the identations in a key.

BACKGROUND OF THE INVENTION

An arrangement for reading the indentations in a key is known heretofore, one example being that shown in my previous U.S. Pat. No. 3,226,811 in which the indentations along the edge of a pre-formed key are read and the information there obtained is used to manufacture a lock with which that key would be used. However, while that key reading structure would be operable for its intended purpose, it has the disadvantage of being relatively slow and of lacking the sensitivity to read and discern different depths of indentations wherein the differences in depth between successive depth stages is relatively small as is the case for example in the type of key as shown in U.S. Pat. No. 3,393,542 which has "dimple" indentations formed into the flat sides of the key blade. In this case the tumblers move transverse to the plane of the key into said dimples to effect an opening position of the lock.

Hence, there exists a need for a new and improved key reading method and apparatus which will overcome the disadvantages of the prior art.

SUMMARY OF THE INVENTION

It is a purpose of the present invention to provide a key reading method and apparatus which is new and improved and overcomes the disadvantages of the prior key reading arrangements.

This purpose of the present invention is achieved by providing an arrangement for positioning a key to be read, utilizing reading pins or the like to sense indentations in the key, providing a plurality of juxtaposed light paths and multiplying the movement of the reading pin to interrupt different groups of said light paths, each group corresponding to a certain depth of the indentation being read. Such an arrangement can be utilized in several different ways. Firstly, the key depth readings thus sensed can be delivered to a lock manufacturing machine such as that shown in my previous U.S. Pat. No. 3,226,811 to cause delivery of the appropriate tumbler pins to the appropriate lock and cylinder recesses to thereby make a lock which will mate with that particular key. As another example, the key reading features of the present invention can be incorporated in a door lock to identify a given key and by this means a given key holder.

A preferred embodiment of the present invention is arranged so as to read "dimple" indentations in the flat side of a key blade. The reading pins, which may be located on one side of the key blade or both sides thereof, would in turn engage a pivotable member at a point closer to its pivot axis than a light blocking portion thereof such that the light blocking portion moved a greater distance than the portion engaged by the reading pin, thereby effecting multiplication of the movement of the latter. The light blocking means could then be utilized in cooperation with a plurality of juxtaposed light paths, thereby interrupting a certain group of said light paths in dependence upon the depth of the dimple indentation being read.

In the preferred embodiment of the invention a pair of reading pins are provided, one on each side of the key being read, each reading pin provided with its own pivotable member and its own set of juxtaposed light paths.

Any number of known arrangements may be provided for establishing the said light paths. For example, the light sources can comprise a bulb, LEDs, fiber-optic light sources or a Lucite illuminating block, and the light detectors can take many forms such as direct photo transistors or fiber optics leading to remote detectors.

In the above described preferred embodiment of the present invention, as a key is inserted into the slot, each indentation positioned along the length of the key is read, a clock line is used to record the fact that successive indentation positions are being read and this continues until all positions are read and the key is fully inserted in the slot. Owing to the speed of the electronics and the low inertia of the mechanical elements utilized in the present invention, the task of reading successive key positions can be accomplished so fast that a key holder inserting the key manually would simply push the key completely into the slot without interruption, in which case the key reader would easily and automatically read all key positions. In one example of the invention sixteen different key positions were read in a total time of seventy milliseconds.

As alternatives to the above described preferred embodiment of the present invention, a plurality of different reading pins can be provided along the length of the key slot so that all of the key positions can be read simultaneously in parallel. It would only be necessary to arrange the reading pins and their respective light blocking members so that each light blocking member had its own set of juxtaposed light paths and did not interfere with the other light paths.

Although the present invention is particularly advantageous with respect to a key of the type having "dimple" indentations formed into the flat sides of the key blade, it will be understood that the present invention can also be used for reading the conventional edge notches in a conventional key such as that shown in my said U.S. Pat. No. 3,226,811.

Hence, it is an object of this invention to provide a new and improved method and apparatus for reading a key.

It is another object of this invention to provide a new and improved method and apparatus for reading a key wherein slight movement of reading pins recording slight differences in indentation depths are multiplied and the multiplied movements interrupt different groups of juxtaposed light paths, which light paths convey information concerning the depths of the indentation being read.

It is still another object of the present invention to provide a new and improved method and apparatus having greater sensitivity and/or speed for sensing indentations in a key for incorporation in a machine for making a lock for use with that key.

It is still another object of the present invention to provide a new and improved method and apparatus for incorporation in a key lock for reading the key and thereby identifying the key holder.

Other objects and advantages of the present invention will become apparent from the detailed description to

BRIEF DESCRIPTION OF THE DRAWINGS

The preferred embodiments of the invention will now be described in greater detail with reference to the accompanying drawings wherein:

FIG. 6 is a perspective view of the type of key to be read by the embodiment of FIGS. 1 through 5.

FIG. 7 is a cross sectional view of a lock which would be operated by the key of FIG. 6.

FIG. 8 is a partial end elevation, partial sectional view taken along line 8—8 of FIG. 7.

FIGS. 9 and 10 are highly schematic views illustrating modifications of the present invention wherein FIG. 9 is taken in a plane corresponding to the plane of FIG. 4 and FIG. 10 is a view taken in the plane of line 10—10 of FIG. 9, which plane corresponds generally to the plane of FIG. 5.

DETAILED DESCRIPTION OF THE PREFERRED EMBODIMENTS

Figure 1:
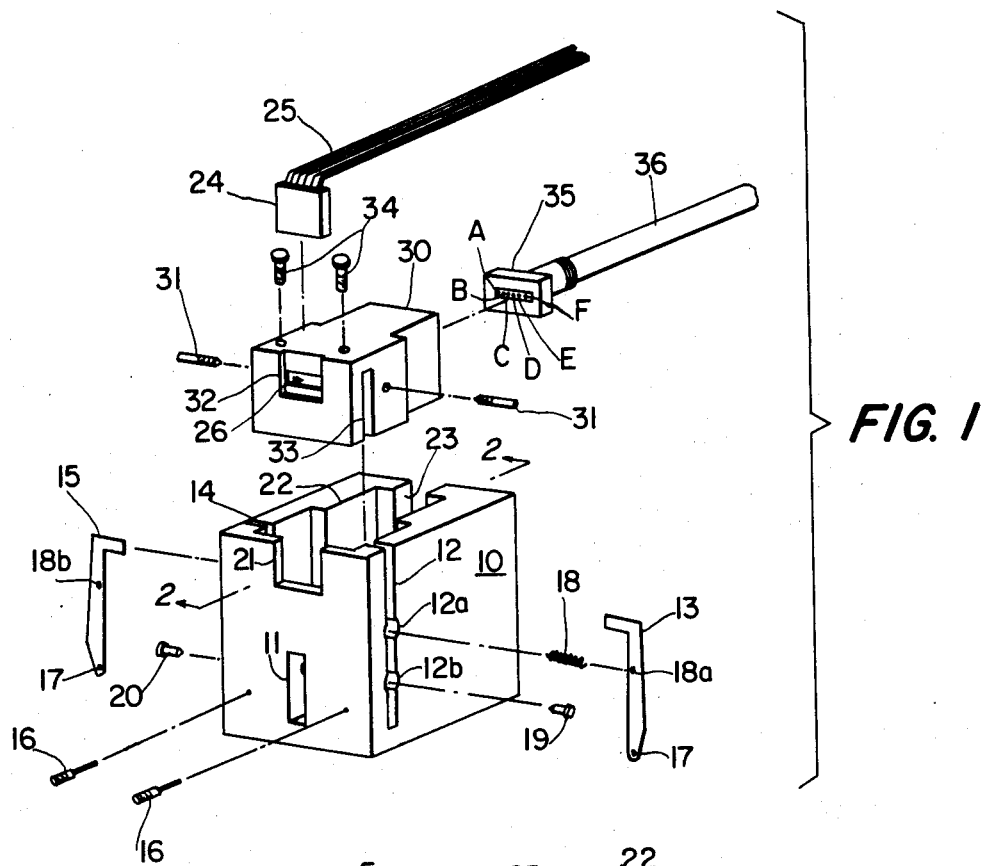
FIG. 1 is an exploded, perspective view showing the apparatus of the present invention.

Referring now to the drawings, like elements are represented by like numerals throughout the several views.

FIG. 1 illustrates the main housing 10 which in assembled form encompasses all of the remaining illustrated elements of the invention. The housing 10 includes a key slot 11 through which the key to be read is inserted.

Before continuing the description of the preferred embodiment, it would be helpful to refer to FIGS. 6-8 for an understanding of the type of key which is to be read with the preferred embodiment of FIGS. 1-5 and the type of lock with which such key is normally used.

FIG. 6 illustrates the key 40 having along the flat blade part thereof a plurality of dimples, in this case four dimples 41-44. The blade includes a bevelled outer end 45. Referring to FIGS. 7 and 8, the former of which includes the key 40 in place and the latter of which does not, in the absence of a key, each tumbler pin 49 is pushed to its innermost position by driving pin 51 and spring 52. In this position a shoulder 53 on the pin 49 engages a shoulder 54 on the lock cylinder 47. The lock cylinder 47 is mounted in a conventional way within a lock housing 46, separated therefrom along the shear line in the form of the cylinder 50 which in the usual way permits turning of the cylinder 47 relative to the lock 46 when all of the tumbler pins have been properly positioned by the key 40 as shown in FIG. 7. The tapered end 45 of course pushes back the inner ends of tumbler pin 49 in a known manner to allow full insertion of the key 40 into the key slot 48.

Returning now to FIG. 1, taken together with FIGS. 2-5, the housing 10 includes a slot 12 extending downwardly along the side thereof and having a pair of widened areas 12a and 12b. The opposite side includes an identical slot 14 with a pair of widened areas identical to the widened areas 12a and 12b. A pair of flags 13 and 15 are passed through the slots 12 and 14 and positioned as shown in the other figures, pivotably mounted on pivot pins 16 and urged towards each other by a spring 18 which engages the two flags 13 and 15 at openings 18a and 18b. Reading pins 19 and 20 are passed through the widened areas 12b and the similar widened area of the slot 14, respectively, until the shoulders 19a and 20a thereof engage mating shoulders 19b and 20b, respectively of the housing, which shoulders define the innermost positions of the reading pins 19 and 20 whereat the inner tips of the pins enter the slot 11 to a depth at least slightly greater than the greatest key indentation depth to be read. Engagement of these shoulders also determines the inward position of the flags 13 and 15 since these flags engage the reading pins and are urged together by the spring 18.

Figure 2:
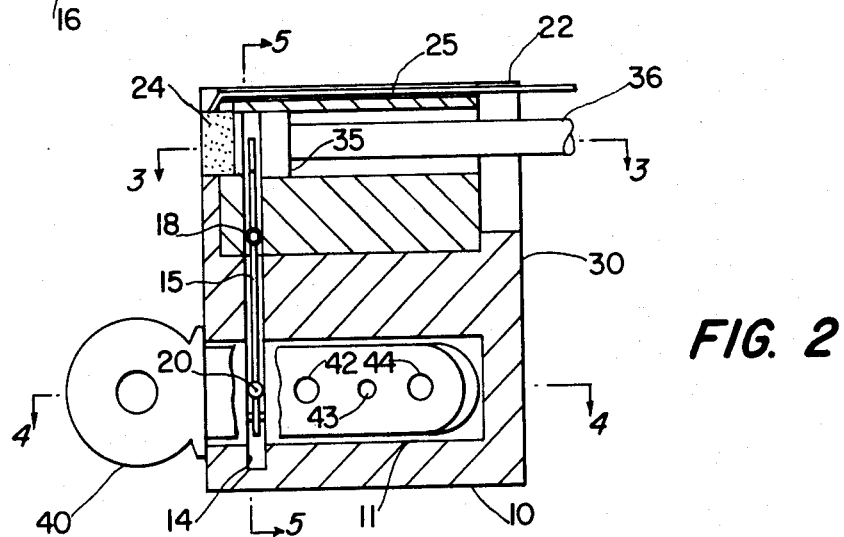
FIG. 2 is a central sectional view of the apparatus in FIG. 1 in its assembled form and with the addition of a key in the slot of the apparatus.
Figure 3:
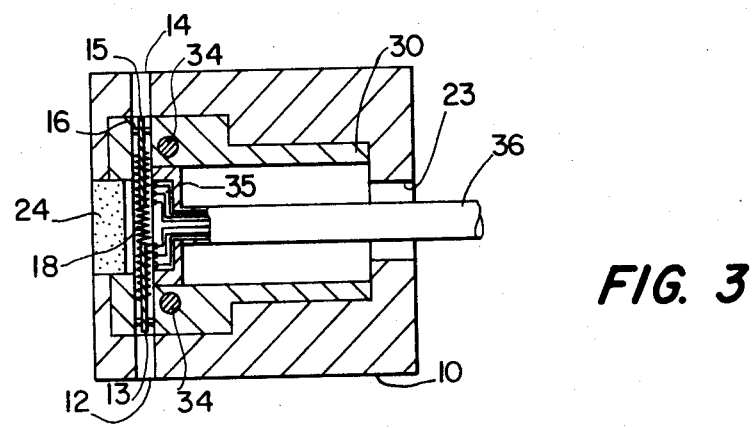
FIG. 3 is a horizontal sectional view taken along line 3—3 of FIG. 2.
Figure 4:
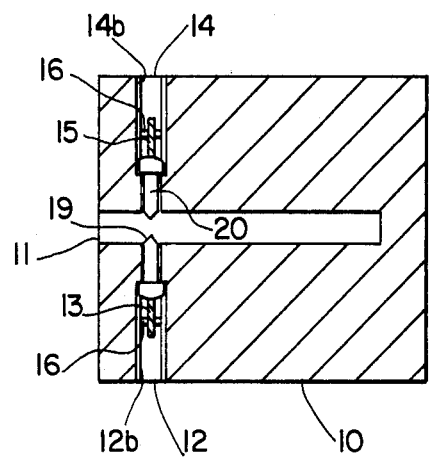
FIG. 4 is a horizontal sectional view taken along line 4—4 of FIG. 2, but without the key in the slot.
Figure 5:
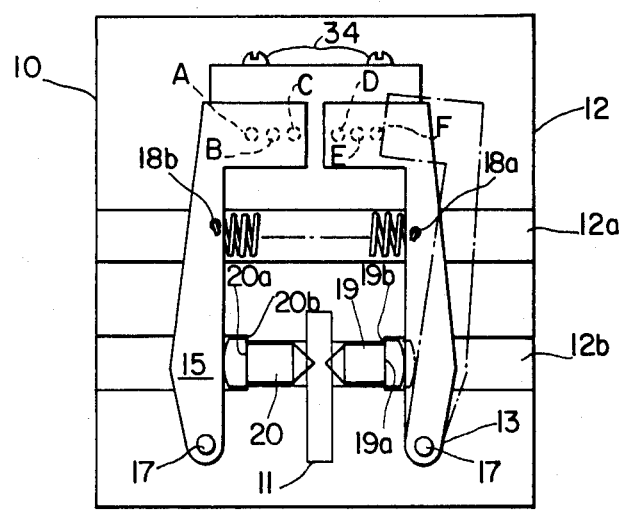
FIG. 5 is a vertical cross sectional view taken in the plane of lines 5—5 in FIG. 2 but without the key in the slot.

At its upper portion the main housing 10 includes an upper opening 22, a front window 21 and a rear opening 23. An upper block 30 is passed downwardly completely into the opening 22 of main housing 10 and secured in place by engagement of bolts 34 with suitable bosses (not shown) on the interior of the lower portion of housing 10. This block 30 includes a front window 32, which is a continuation of the window 21, and flag slots 33 which are continuations of slots 12 and 14. As best shown in FIGS. 2 and 3, the block 30 is essentially hollow, thereby adapted to receive through the rear thereof a device 35 containing photo-optic detectors, this example including six detectors A through F which are connected to fiber-optic passages within cable 36. A Lucite illuminating block 24 fits in the window area formed by openings 21 and 33 and the light therefrom passes into the block 30 through the opening 26 while light is brought to the illuminating block by flat cables 25 which lie over the block 30 and pass outwardly through the rear opening 23 of housing 10.

It will be understood that the present invention can utilize any one of a large number of optical arrangements and is not limited to the one described above. For example the light may be visible or infrared light, the light may be provided by either a bulb, a light emitting diode, fiber-optics brought directly to the window 26 or the Lucite block as shown above; and the detectors A through F may include fiber-optics as shown herein or photo transistors mounted directly at positions A through F. Light paths formed by light emitting diodes may be spaced apart as little as one tenth of an inch.

Although the present invention can be designed to read a virtually unlimited number of bit positions, i.e. operative positions along the key, any number of possible depths of the indentations and also either one side of the key or both sides of the key, by way of illustration, the embodiment of FIGS. 1 through 5 is designed to read both sides of the key and four different depth positions. The latter limitation results only from the presence of only three light paths on each side of the center plane. Referring to the right hand flag 13 of FIG. 5, the maximum depth would uncover none of the light paths D, E or F while three successive shallower depths would cause the uncovering of light path D, light paths D and E, and light paths D, E and F, respectively. Obviously if a larger number of different possible depths were desired, a larger number of these light paths would be provided to the right of light path F.

One advantage of the mechanical and electrical features as combined in the present invention is the speed of operation. Thus, in the description of the operation to follow wherein it is stated that the key is pushed into the slot in steps, permitting the apparatus to sense the first set of indentations, and then subsequently the second, third and fourth sets of indentations, it will be understood that in practice this device operates so fast that this sequence may be accomplished even if the operator pushes the key into the slot continuously as one would normally push a key into a slot without regard to such steps. This is possible because the present invention is capable of reading each position so rapidly, e.g. sixteen positions in seventy milliseconds.

The method of operation of the present invention, with special reference to the embodiment of FIGS. 1 through 5, is as follows. The key to be read is pushed into the slot 11. Assuming the key is in fact the key 40 of FIG. 6, when the dimples or indentations 44 are aligned with the reading pins 19 and 20 they enter the dimples 44 on opposite sides of the key and in response to the depths of those indentations (they may of course be different on opposite sides of the key), they push back their respective flag members 13 and 15 to uncover the appropriate number of the light paths D-F on the right hand side of FIG. 5 and A-C on the left hand side of FIG. 5. As the key continues into the slot the next positions 43, 42 and 41 are then read in an identical manner.

One main use of the present invention is in the manufacture of a lock for use with this specific key 40. In this case precisely which of the four dimple positions 41-44 was being read would be known by the use of a clock line. This information would then be used by an apparatus such as that shown in my U.S. Pat. No. 3,226,811 to deliver signals to the pin distribution system of a lock manufacturing device for delivering the correctly sized tumbler pins 49 (see FIG. 7) for insertion into the proper recesses in the lock cylinder 47 and the lock housing 46 (together of course with the uniformly sized driving pins 51 and springs 52).

It should be understood that the basic concepts of the present invention, as described above with respect to the apparatus and operation of the embodiment of FIGS. 1 through 5, is capable of numerous variations.

A first variation is that instead of a single reading set on each side of the slot (i.e., a set including a reading pin, a flag part and the appropriate light paths) together with a clock line for noting which key position is at that single set, it is also possible to provide a plurality of different sets in parallel along the same side of the slot, one set for each key position, so that the key can simply be inserted into the slot and all of the bit positions sensed simultaneously. To accomplish this, it is necessary only to provide the various mechanical and optical elements such that each set has its own set of light paths positioned such that they are not interfered with by movement of the mechanical elements of the other sets. This can be accomplished by placing the subsequent light sets either above the first light set or outwardly thereof.

Figure 9:
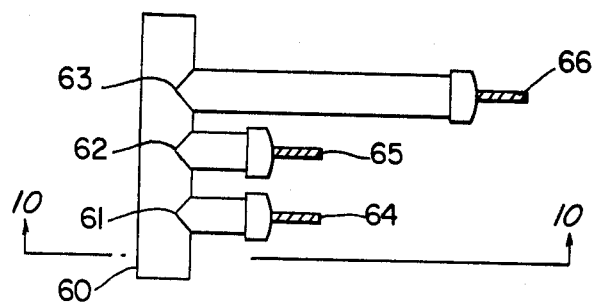
Figure 10:
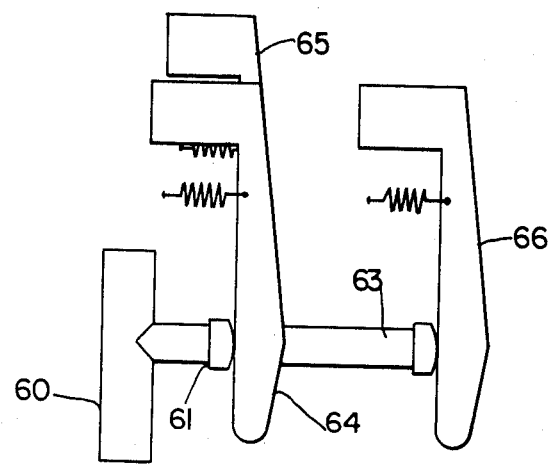

FIGS. 9 and 10 represent not a specific embodiment, but rather they illustrate diagramatically the two possible variations for placing subsequent sets. Assuming that the reading pin 61 and flag part 64 represent the front set, i.e. the set corresponding to the single one shown in FIGS. 1 through 5, the subsequent sets can include reading pin 62 with flag parts 65 similar to the flag part 64 but having a greater height so that the light path associated therewith will be located above and out of the way of flag part 64. Alternatively, as also shown the reading pin can be made much longer such as shown at pin 63 and this can be coupled with a flag part 66 which is identical to the flag part 64 except that it is located outwardly thereof such that its movement does not interfere with the light paths of the other flag parts, and vice versa. If successive flag parts were placed outwardly such as with the flag part 66, it would of course require a housing which became much larger at the rear end than the front part, i.e. it would not be rectangular as is the housing part 10 of FIG. 1. As between these two alternatives, the alternative of using a flag of the same height but located outwardly is the preferable embodiment since this flag would have a movement multiplication factor identical to that of the first flag 64 so that it could employ optical elements identical to those employed by the flag 64. In contrast, the taller flag 65 would move a greater distance than the flag 64 and thereby require a different optical means with the light paths located farther apart than with the flag part 64.

Figure 11:
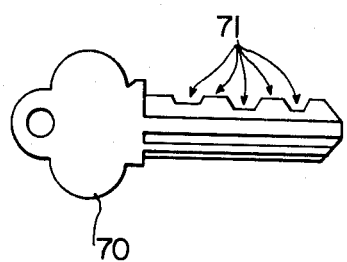
FIG. 11 illustrates a conventional key of the type having notched indentations at bit positions along its length.
Figure 12:
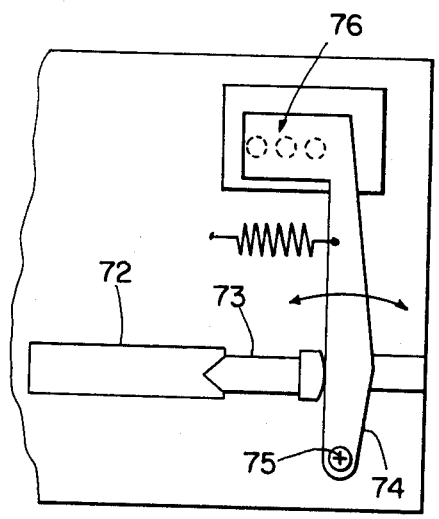
FIG. 12 illustrates schematically a modification of the present invention adapted to read the conventional key of FIG. 11, this view taken in a plane corresponding to the plane of FIG. 5.

Another variation of the present invention is described with respect to FIGS. 11 and 12. These figures illustrate how the present invention can be utilized to sense the indentations in a conventional key 70 with edge notchings 71. The key would be inserted into the slot 72 horizontally such that the reading pin 73 would sense the depth of notches 71, thereby turning the flag part 74 about the axis 75, unblocking successive light paths 76 in a manner identical to the manner as described with respect to FIGS. 1 through 5.

Another application of the present invention is in combination with a door lock itself to identify a given key and by this means also a certain holder of the key. This application would of course find wide use in any area where is was necessary not only to prevent access without a key, but also to limit access to certain persons, i.e. certain key holders.

Although the invention has been described in considerable detail with respect to preferred embodiments thereof, it will be apparent that the invention is capable of numerous modifications and variations, apparent to those skilled in the art, without departing from the spirit and scope of the invention, as defined in the claims.

I claim:

1. An apparatus for reading indentations in a key, comprising:
   a housing having a key opening, a rectangular key slot extending from said key opening longitudinally into the housing for receiving a key which essentially mates with the cross-section of the key slot, said key slot cross-section having at least one generally flat operative side which faces a side of the key which is generally flat and has indentations therein,
   at least one flag slot extending in a plane perpendicular to the said operative side of the key slot and intersecting that side, a reading pin in the flag slot, said reading pin being movable therein in a direction perpendicular to the said operative side of the key slot and intersecting said side, such that the pin enters the key slot across the said operative side at a point to sense conditions on the facing side of a key inserted into the key slot, limiting means to limit inward movement of the reading pin to an inward limiting position at which its end is in the key slot, a flag member in the flag slot, said flag member extending longitudinally in a plane which is generally parallel to the said operative side of the key slot, a pivot connection pivotally connecting said flag member in the housing for movement toward and away from the plane of the operative side of the key slot, said flag member engaging the reading pin, and a spring urging the flag member in a direction to urge the pin to its inward limiting position, a light source and a light detector positioned to provide a light path in the housing, said flag member having a flag portion thereon located farther from the said pivot connection of the flag member than the reading pin is spaced from said pivot connection, such that movement of the flag portion is multiplied relative to corresponding movement of the reading pin, said flag portion being pivotally movable between at least an inward position corresponding to its pin sensing a certain depth of indentation on the said generally flat side of the key, and an outward position pivoted away from the inward position by the reading pin contacting a portion of the key at which the depth of the indentation is less than said certain depth, the flag portion being positioned to move across the said light path such that in one of said inward or outward positions it blocks the light path, and in the other position it unblocks the light path, and a clock line means for distinguishing each reading of the key by the pin from readings at successive positions along the key, as the key is moved into the key slot, past the reading pin, whereby a plurality of different reading positions along the said generally flat side of a key can be read rapidly as the key is inserted and moved into the key slot.

2. An apparatus according to claim 1, comprising a pair of said flag slots, one on each side of the key slot, a said reading pin, a said flag member having a flag portion and a said light path being provided for each of said flag slots, whereby opposed flat sides of the key can be read simultaneously as the key is inserted into the slot.

3. An apparatus according to claim 1, including means for providing a plurality of parallel light paths associated with said flag portions, the said flag portions blocking all of said light paths in the said inward position of the pin, and said flag portions successively uncovering the light sources as the pin moves towards its outward position.

4. An apparatus according to claim 1, said light detector comprising fiber optic light paths for conveying the unblocked light to a remote reading point.

5. An apparatus according to claim 1, said light detector being a photo transistor.

6. An apparatus according to claim 4 or claim 5, said light source being an LED.

7. A method for reading the code on a key comprising the steps of:

positioning in a key slot within a housing a key which has generally flat sides with indentations on at least one side thereof corresponding to the code to be read, urging a reading pin, mounted in the housing, into the slot, such that the tip of the reading pin moves into the key slot under a spring force to an inward limiting position, providing at least one light path, in the housing, between a light source and a light detector, moving a pivotally mounted elongated flag member between inward and outward limiting positions under the action of the reading pin sensing an indentation of a certain depth on the side of the key or an indentation of less than said certain depth, respectively, and arranging a portion of the flag member to block a light path in one of said positions of the reading pin and unblock it in the other of said reading pin positions, and distinguishing successive readings of the key from each other as the key is moved into the slot, such that as the key is moved continuously into the key slot successive positions can be read and distinguished from each other.

8. A method according to claim 7, including sensing indentations on both sides of the key as the key is moved into the key slot.

9. A method according to claim 7, including providing a plurality of light paths, and wherein the flag member successively uncovers more light paths as the reading pin senses a lesser depth of indentation on the side of the key.

* * * * *